US009087520B1

(12) United States Patent
Salvador

(10) Patent No.: US 9,087,520 B1

(45) Date of Patent: Jul. 21, 2015

(54) ALTERING AUDIO BASED ON NON-SPEECH COMMANDS

(71) Applicant: Rawles LLC, Wilmington, DE (US)

(72) Inventor: Stan Weidner Salvador, Tega Cay, SC (US)

(73) Assignee: Rawles LLC, Wilmington, DE (US)

( * ) Notice: Subject to any disclaimer, the term of this patent is extended or adjusted under 35 U.S.C. 154(b) by 191 days.

(21) Appl. No.: 13/714,236

(22) Filed: Dec. 13, 2012

(51) Int. Cl.
*G06F 3/16* (2006.01)
*G10L 25/84* (2013.01)

(52) U.S. Cl.
CPC .................................... *G10L 25/84* (2013.01)

(58) Field of Classification Search
USPC ........................................................ 704/275
See application file for complete search history.

(56) References Cited

U.S. PATENT DOCUMENTS 7,418,392 B1 8/2008 Mozer et al.
7,720,683 B1 5/2010 Vermeulen et al.
7,774,204 B2 8/2010 Mozer et al.
7,949,529 B2 * 5/2011 Weider et al. ................. 704/270
8,103,504 B2 * 1/2012 Ohguri et al. ................. 704/258
8,189,430 B2 * 5/2012 Kitaura ......................... 367/127
8,195,468 B2 * 6/2012 Weider et al. ................. 704/275
8,447,607 B2 * 5/2013 Weider et al. ................. 704/250
8,562,186 B2 * 10/2013 Gutstein et al. ............... 362/392
8,797,465 B2 * 8/2014 Hardacker et al. ............ 348/734
2012/0223885 A1 9/2012 Perez

FOREIGN PATENT DOCUMENTS

WO WO2011088053 A2 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Susan McFadden
(74) *Attorney, Agent, or Firm* — Lee & Hayes, PLLC

(57) ABSTRACT

Techniques for altering audio being output by an audio-controlled device, or another device, to enable more accurate automatic speech recognition (ASR) by the audio-controlled device. For instance, an audio-controlled device may output audio within an environment using a speaker of the device. While outputting the audio, a microphone of the device may capture sound within the environment and may generate an audio signal based on the captured sound. The device may then analyze the audio signal to identify a predefined non-speech command issued by a user within the environment. In response to identifying the predefined non-speech command, the device may somehow alter the output of the audio for the purpose of reducing the amount of noise within subsequently captured sound.

22 Claims, 4 Drawing Sheets

ALTERING AUDIO BASED ON NON-SPEECH COMMANDS

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

When interacting with a device through speech, a device may perform automatic speech recognition (ASR) on audio signals generated from sound captured within an environment for the purpose of identifying voice commands within the signals. However, the presence of audio in addition to a user's voice command (e.g., background noise, etc.) may make difficult the task of performing ASR on the audio signals.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
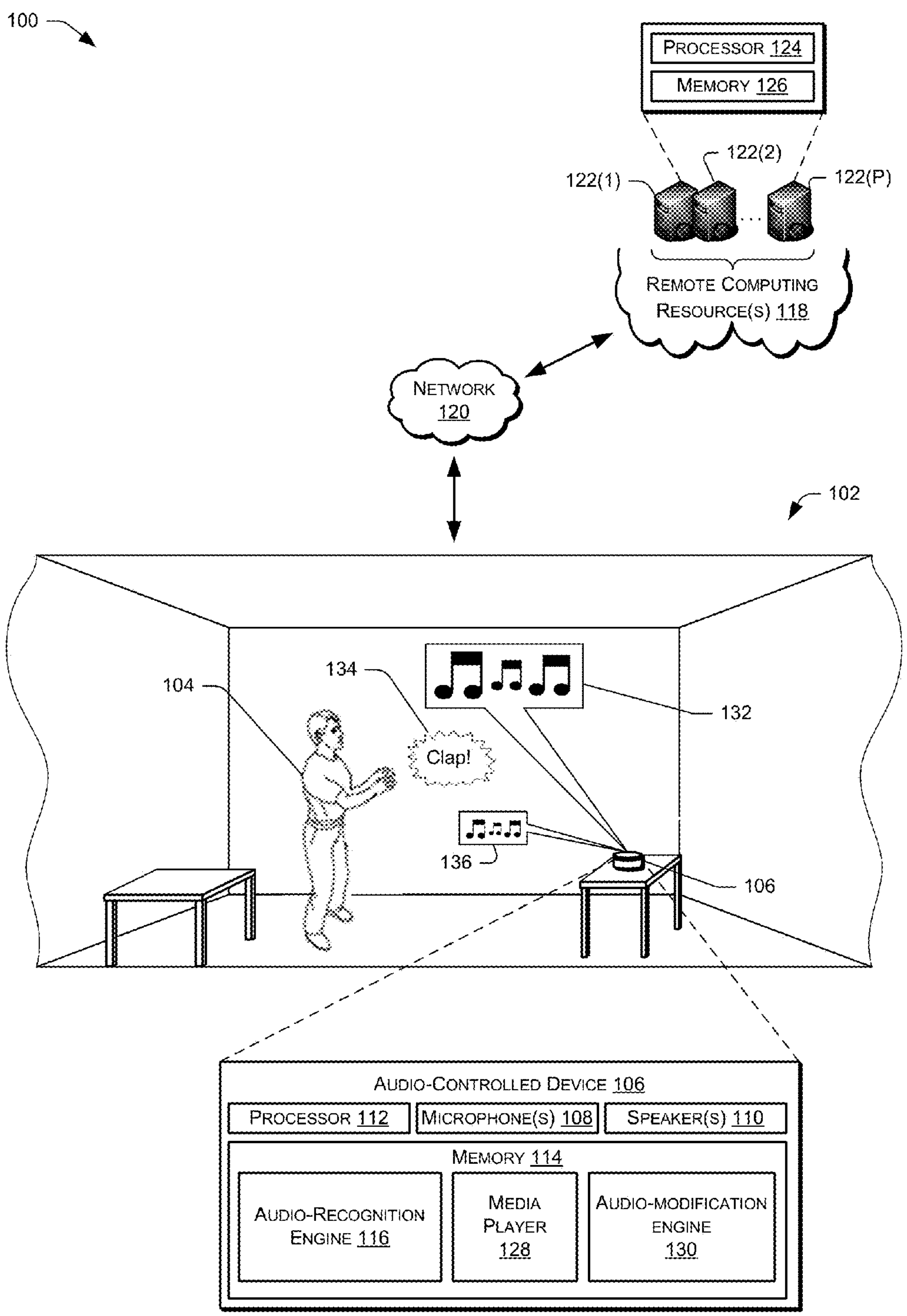
FIG. 1 shows an illustrative voice interaction computing architecture set in a home environment. The architecture includes an audio-controlled device physically situated in the home, along with a user who wishes to provide commands to the device. In this example, the user first issues a non-speech command, which in this example comprises the user clapping. In response to identifying this non-speech command, the device alters the output of audio that the device outputs in order to increase the accuracy of automatic speech recognition (ASR) performed on subsequent speech of the user captured by the device.

This disclosure describes, in part, techniques for altering audio being output by an audio-controlled device, or another device, to enable more accurate automatic speech recognition (ASR) by the audio-controlled device. For instance, an audio-controlled device may output audio within an environment using a speaker of the device. While outputting the audio, a microphone of the device may capture sound within the environment and may generate an audio signal based on the captured sound. The device may then analyze the audio signal to identify a predefined non-speech command issued by a user within the environment. In response to identifying the predefined non-speech command, the device may somehow alter the output of the audio for the purpose of reducing the amount of noise within subsequently captured sound.

For instance, the device may alter a signal sent to the speaker to attenuate the audio, pause the audio (e.g., by temporarily ceasing to send the signal to the speaker), turn off one or more speakers of the device (e.g., by ceasing to send the signal to a speaker or by powering off the speaker), switch the signal sent to the speaker from a stereo signal to a mono signal, or otherwise alter the output of the audio. By altering the output of the audio, an audio signal generated from the sound subsequently captured by the device will include less noise and, hence, will have a higher signal-to-noise ratio (SNR). This increased SNR increases the accuracy of speech recognition performed on the audio signal and, therefore, the device is more likely to decode a voice command from the user within the audio signal.

To illustrate, envision that an audio-controlled device is outputting a song on one or more speakers of the device. While outputting the audio, envision that a user wishes to provide a voice command to the device. However, if the device is playing the song quite loudly, then the user may feel the need to speak loudly or yell in order to ensure that the device captures the user's speech over the existing audio. However, when performing speech recognition on generated audio signals, the device may utilize acoustic models that have been largely trained based on users speaking in a normal tone and at a normal volume. As such, despite the increase volume of the user attempting to talk over the song, the device may actually be less effective at recognizing speech within the audio signal that includes the user's voice command.

As such, as described below, the user may first issue a non-speech command in order to instruct the device to alter the output of the audio in order to increase the efficacy of speech recognition performed on subsequent voice commands issued by the user. For instance, in one example the user may clap his or her hands together and, in response to identifying this non-speech command, the device may attenuate or lower the volume of the song being output. Because the song is now playing at a lower volume, the user may be more comfortable issuing a voice command at a normal volume—that is, without attempting to yell over the song that the device is playing. Because the user is speaking in a normal tone and at a normal volume, the device may more effectively perform speech recognition and may identify the user's voice commands with more accuracy.

While the above example describes a user clapping, it is to be appreciated that the device may be configured to alter the audio in response to any other additional or alternative non-speech commands. For instance, the device may alter the audio in response to the user whistling, striking an object in the environment (e.g., tapping on a wall or table), stomping his or her feet, snapping his or her fingers, and/or some combination thereof. In addition, the device may be configured to alter the audio in response to identifying a predefined number of non-speech commands and/or a predefined pattern. For instance, the device may be configured to alter the audio in response to a user clapping three times in a row, issuing a tapping sound and then subsequently clapping, whistling with an increased or decreased frequency over time, or the like.

In addition, the device may alter the output of the audio in multiple ways in order to increase the efficacy of the subsequent speech recognition. For instance, the device may attenuate the audio, pause or turn off the audio, switch the audio from stereo to mono, turn off one or more speakers, or the like.

After the device alters the audio, the user may provide voice commands to the device. In some examples, the user may then utter one or more predefined words that, when recognized by the device, results in the device providing subsequent audio signals to one or more computing devices that are remote from the environment. These remote computing devices may be configured to perform speech recognition on still subsequent voice commands from the user. In combination, when a device is outputting audio, a user may first issue a non-speech command (e.g., a clap), which results in the device attenuating the audio or otherwise modifying the output of the audio. Thereafter, the user may speak a predefined utterance (e.g., "wake up") that is recognized by the device. The user may thereafter issue additional voice commands (e.g., "please play the next song"), which may be recognized by the remote computing resources. The remote computing resources may then cause performance of the action, such as instructing the voice-controlled device to play a subsequent song, as requested by the user.

The devices and techniques described above and below may be implemented in a variety of different architectures and contexts. One non-limiting and illustrative implementation is described below.

FIG. 1 shows an illustrative voice interaction computing architecture 100 set in a home environment 102 that includes a user 104. The architecture 100 also includes an electronic audio-controlled device 106 with which the user 104 may interact. In the illustrated implementation, the audio-controlled device 106 is positioned on a table within a room of the home environment 102. In other implementations, it may be placed in any number of locations (e.g., ceiling, wall, in a lamp, beneath a table, under a chair, etc.). Further, more than one device 106 may be positioned in a single room, or one device may be used to accommodate user interactions from more than one room.

Generally, the audio-controlled device 106 has microphone unit that includes a microphone unit that includes at least one microphone 108 and a speaker unit that includes at least one speaker 110 to facilitate audio interactions with the user 104 and/or other users. In some instances, the audio-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the audio-controlled device 106 is provided below in more detail with reference to FIG. 4.

The microphone 108 of the audio-controlled device 106 detects audio from the environment 102, such as sounds uttered from the user 104, and generates a corresponding audio signal. As illustrated, the audio-controlled device 106 includes a processor 112 and memory 114, which stores or otherwise has access to an audio-recognition engine 116. As used herein, a processor may include multiple processors and/or a processor having multiple cores. The audio-recognition engine 116 performs audio recognition on signals generated by the microphone based on sound within the environment 102, such as utterances spoken by the user 104. For instance, the engine 116 may identify both speech (i.e., voice commands) of the user and non-speech commands (e.g., a user clapping, tapping a table, etc.). The audio-controlled device 106 may perform certain actions in response to recognizing this audio, such as speech from the user 104. For instance, the user may speak predefined commands (e.g., "Awake", "Sleep", etc.), or may use a more casual conversation style when interacting with the device 106 (e.g., "I'd like to go to a movie. Please tell me what's playing at the local cinema.").

In some instances, the audio-controlled device 106 may operate in conjunction with or may otherwise utilize computing resources 118 that are remote from the environment 102. For instance, the audio-controlled device 106 may couple to the remote computing resources 118 over a network 120. As illustrated, the remote computing resources 118 may be implemented as one or more servers 122(1), 122(2), . . . , 122(P) and may, in some instances, form a portion of a network-accessible computing platform implemented as a computing infrastructure of processors, storage, software, data access, and so forth that is maintained and accessible via a network such as the Internet. The remote computing resources 118 do not require end-user knowledge of the physical location and configuration of the system that delivers the services. Common expressions associated for these remote computing resources 118 include "on-demand computing", "software as a service (SaaS)", "platform computing", "network-accessible platform", "cloud services", "data centers", and so forth.

The servers 122(1)-(P) include a processor 124 and memory 126, which may store or otherwise have access to some or all of the components described with reference to the memory 114 of the audio-controlled device 106. In some instances the memory 126 has access to and utilizes another audio-recognition engine for receiving audio signals from the device 106, recognizing audio (e.g., speech) and, potentially, causing performance of an action in response. In some examples, the audio-controlled device 106 may upload audio data to the remote computing resources 118 for processing, given that the remote computing resources 118 may have a computational capacity that far exceeds the computational capacity of the audio-controlled device 106. Therefore, the audio-controlled device 106 may utilize an audio-recognition engine at the remote computing resources 118 for performing relatively complex analysis on audio captured from the environment 102. In one example, the audio-recognition 116 performs relatively basic audio recognition, such as identifying non-speech commands for the purpose of altering audio output by the device and identifying a predefined voice command that, when recognized, causes the device 106 to provide the audio the remote computing resources 118. The remote computing resources 118 may then perform speech recognition on these received audio signals to identify voice commands from the user 104.

Regardless of whether the speech recognition occurs locally or remote from the environment 102, the audio-controlled device 106 may receive vocal input from the user 104 and the device 106 and/or the resources 118 may perform speech recognition to interpret a user's operational request or command. The requests may be for essentially type of operation, such as authentication, database inquires, requesting and consuming entertainment (e.g., gaming, finding and playing music, movies or other content, etc.), personal management (e.g., calendaring, note taking, etc.), online shopping, financial transactions, and so forth.

The audio-controlled device 106 may communicatively couple to the network 120 via wired technologies (e.g., wires, USB, fiber optic cable, etc.), wireless technologies (e.g., RF, cellular, satellite, Bluetooth, etc.), or other connection technologies. The network 120 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

As illustrated, the memory 114 of the audio-controlled device 106 also stores or otherwise has access to the audio-recognition engine 116, a media player 128, and an audio-modification engine 130. The media player 128 may function to output any type of content on any type of output component of the device 106. For instance, the media player may output audio of a video or standalone audio via the speaker 110. For instance, the user 104 may interact (e.g., audibly) with the device 106 to instruct the media player 128 to cause output of a certain song or other audio file.

The audio-modification engine 130, meanwhile, functions to modify the output of audio being output by the speaker 110 or a speaker of another device for the purpose of increasing efficacy of the audio-recognition engine 116. For instance, in response to the audio-recognition engine 116 identifying a predefined non-speech command issued by the user 104, the audio-modification engine 130 may somehow modify the output of the audio to increase the accuracy of speech recognition performed on an audio signal generated from sound captured by the microphone 108. The engine 130 may modify output of the audio being output by the device, or audio being output by another device that the device 106 is able to interact with (e.g., wirelessly, via a wired connection, etc.).

As described above, the audio-modification engine 130 may attenuate the audio, pause the audio, switch output of the audio from stereo to mono, attenuate a particular frequency range of the audio, turn off one or more speakers outputting the audio or may alter the output of the audio in any other way. Furthermore, the audio-modification engine 130 may determine how or how much to alter the output the audio based on one or more of an array of characteristics, such as a distance between the user 104 and the device 106, a direction of the user 104 relative to the device 106 (e.g., which way the user 104 is facing relative to the device), the type or class of audio being output, and/or the identity of the user 104.

In the illustrated example, the audio-controlled device 106 plays a song at a first volume, as illustrated at 132. At 134, the user 104 issues a predefined non-speech command, which in this example comprises the user clapping. As described above, the predefined non-speech command may additionally or alternatively comprise the user whistling, striking an object, stomping his feet, snapping his fingers, and/or the like. The predefined non-speech command may also comprise a particular pattern, such as a particular pattern of clapping or a combination of clapping, tapping an object, and whistling.

In each of these instances, the microphone 108 captures sound that includes the non-speech command and generates a corresponding audio signal. The audio-recognition engine 116 then analyzes this audio signal to determine whether the audio signal includes a predefined non-speech command. In the example of a clapping sound, the engine 116 may determine whether the audio signal includes a relatively short pulse having a large amplitude and high frequency. In some instances, the engine 116 utilizes a trained classifier that classifies a received audio signal as either including the predefined non-speech command or not. Alternatively, the engine 116 may utilize a Hidden Markov Model (HMM) having multiple, trained states to identify the predefined non-speech command. Other techniques, such as statistical models, a matched filter, a neural network classifier, or a support vector machine, may be used as well.

Regardless of the audio recognition techniques used, upon identifying the non-speech command the engine 116 may provide an indication of the command to the audio-modification engine 130. The engine 130 may then instruct the media player 128 to somehow alter the output of the audio. For instance, FIG. 1 illustrates, at 136, the media player 128 attenuating the audio. Of course, while FIG. 1 illustrates lowering a volume of the audio being output, in other instances the audio-modification engine 130 may instruct the media player 128 to alter the output of the audio in any other way.

Figure 2:
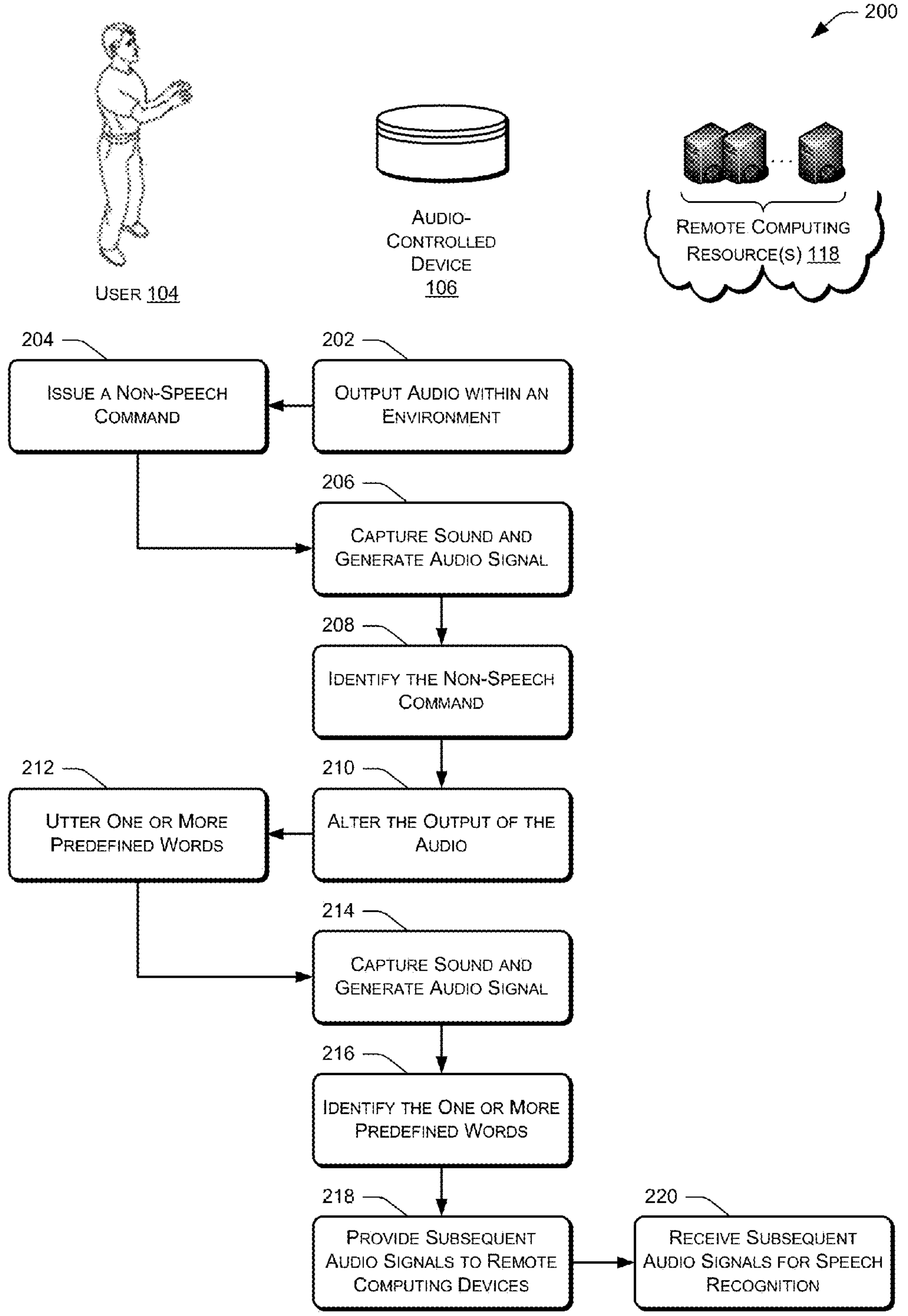
FIG. 2 depicts a flow diagram of an example process for altering (e.g., attenuating) audio being output by the audio-controlled device of FIG. 1 to increase the efficacy of ASR by the device.

FIG. 2 depicts a flow diagram of an example process 200 for altering audio being output by the audio-controlled device of FIG. 106 1 to increase the efficacy of ASR by the device 106 or by other computing devices (e.g., the remote computing resources 118). In this example, operations illustrated underneath a respective entity may be performed by that entity. Of course, while FIG. 2 illustrates one implementation, it is to be appreciated that the operations may be performed by other entities in other implementations.

The process 200 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 202, the audio-controlled device 106 outputs audio within an environment, such as the environment 102 of FIG. 1. This audio may comprise a song, an audio book, or any other type of audio. At 204, the user 104 issues a non-speech command. For instance, the user may clap, snap his fingers, tap a table, or the like. At 206, the voice-controlled device 106 captures sound within the environment and generates a corresponding audio signal. At 208, the device 106 performs audio recognition to identify the non-speech command issued by the user. In some instances, the device 106 utilizes acoustic echo cancelation (AEC) techniques to filter out the audio both output by a speaker of the device and captured by the microphone of the device. For instance, the device 106 may utilize a reference signal associated with the audio being output to filter out sound associated with this audio.

At 210, and in response to identifying the non-speech command, the device 106 alters the output of the audio by, for example, attenuating the volume. At this point, the user 104 may issue one or more voice commands without feeling the need to yell over the audio. As such, the device may more accurately perform speech recognition on the captured speech.

In the illustrated example, at 212 the user 104 utters one or more predefined words that, when recognized by the device 106, result in the device 106 transitioning states. For instance, the device 106 may transition from a state in which the device 106 performs local and relatively simple speech recognition to a state in which the device 106 provides generated audio signals to the remote computing resources 118 for performing relatively complex speech recognition.

At 214, the device 106 captures sound and generates an audio signal that includes the user speaking the predefined word(s). At 216, the device 106 identifies the predefined word(s) and, potentially, any commands included in the audio signal (e.g., "wake up, please add milk to my grocery list"). In response to identifying the one or more predefined words, at 218 the device 106 begins providing audio signals generated by the device to the remote computing resources 118, which receive these audio signals at 220. The remote computing resources 118 then perform speech recognition on these captured audio signals to identify voice commands from the user. In response to identifying a particular command, the remote computing resources 118 may cause performance of an action associated with the command, which may include instructing the device to perform an operation (e.g., provide a reply back to the user, etc.).

Figure 3:
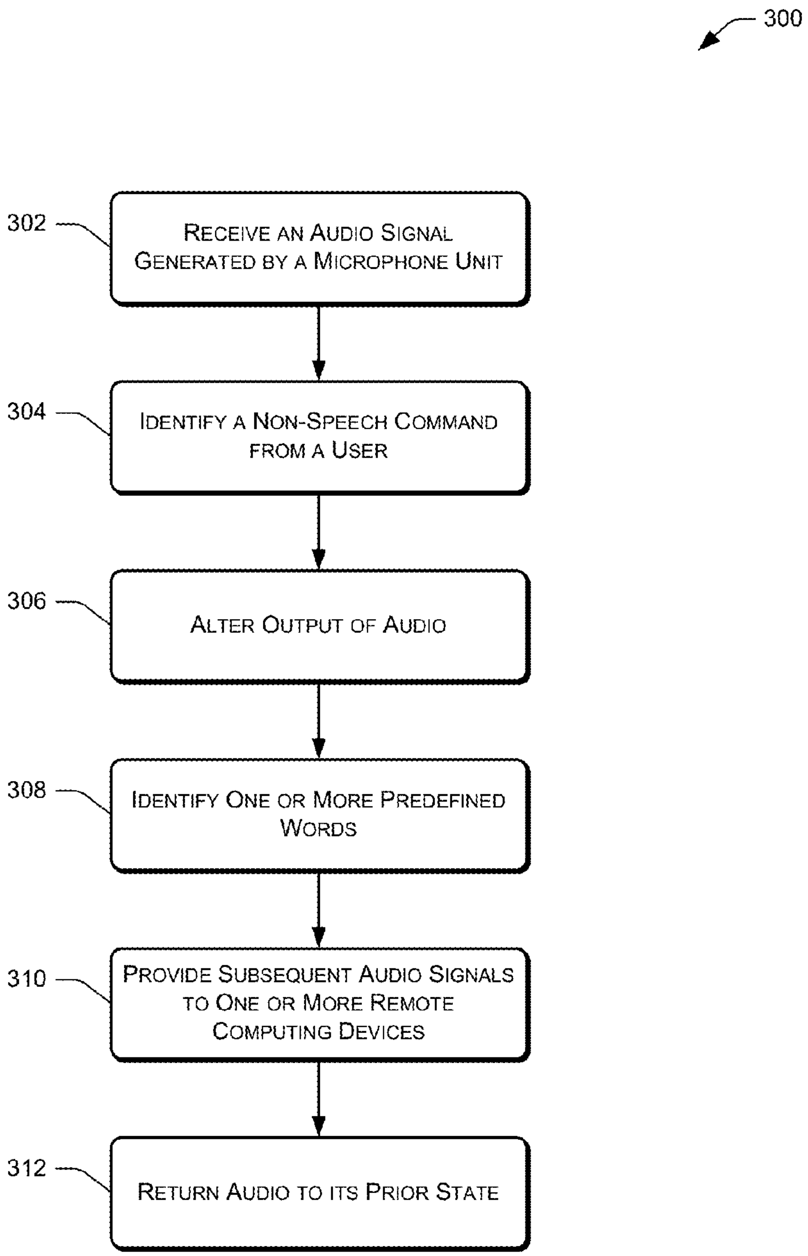
FIG. 3 depicts a flow diagram of another example process for altering the output of audio to increase the efficacy of ASR performed on user speech.

FIG. 3 depicts a flow diagram of another example process 300 for attenuating audio to increase the efficacy of ASR performed on user speech. At 302, the process 300 receives an audio signal generated by a microphone unit. At 304, the process 300 identifies a non-speech command from the audio signal, as described above. At 306, the process 300 then alters output of audio that is being output in response to identifying this command. Again, this may include attenuating the audio, pausing the audio, turning off a speaker, switching the audio from stereo to mono, or the like.

At 308, the process 300 then identifies one or more predefined words that, which result in the device transitioning from a first state to a second, different state. At 310, the process 300 begins providing subsequent audio signals to one or more remote computing resources in response to identifying the predefined word(s). Finally, at 312 the process 300 returns the audio to its prior state (i.e., to its state prior to the process 300 altering the audio at 306). For instance, if the process 300 attenuated the audio at 306, at 312 the process 300 may increase the volume of the audio back to what it was prior to the user issuing the non-speech command. The process 300 may cause the audio to return to its prior state a certain amount of time after identifying the non-speech command (e.g., two seconds after identifying the user clapping), a certain amount of time after a user ceases issuing voice commands (e.g., after two seconds of audio that does not include user speech), in response to detecting another non-speech command issued by the user (e.g., the user again clapping), or the like.

Figure 4:
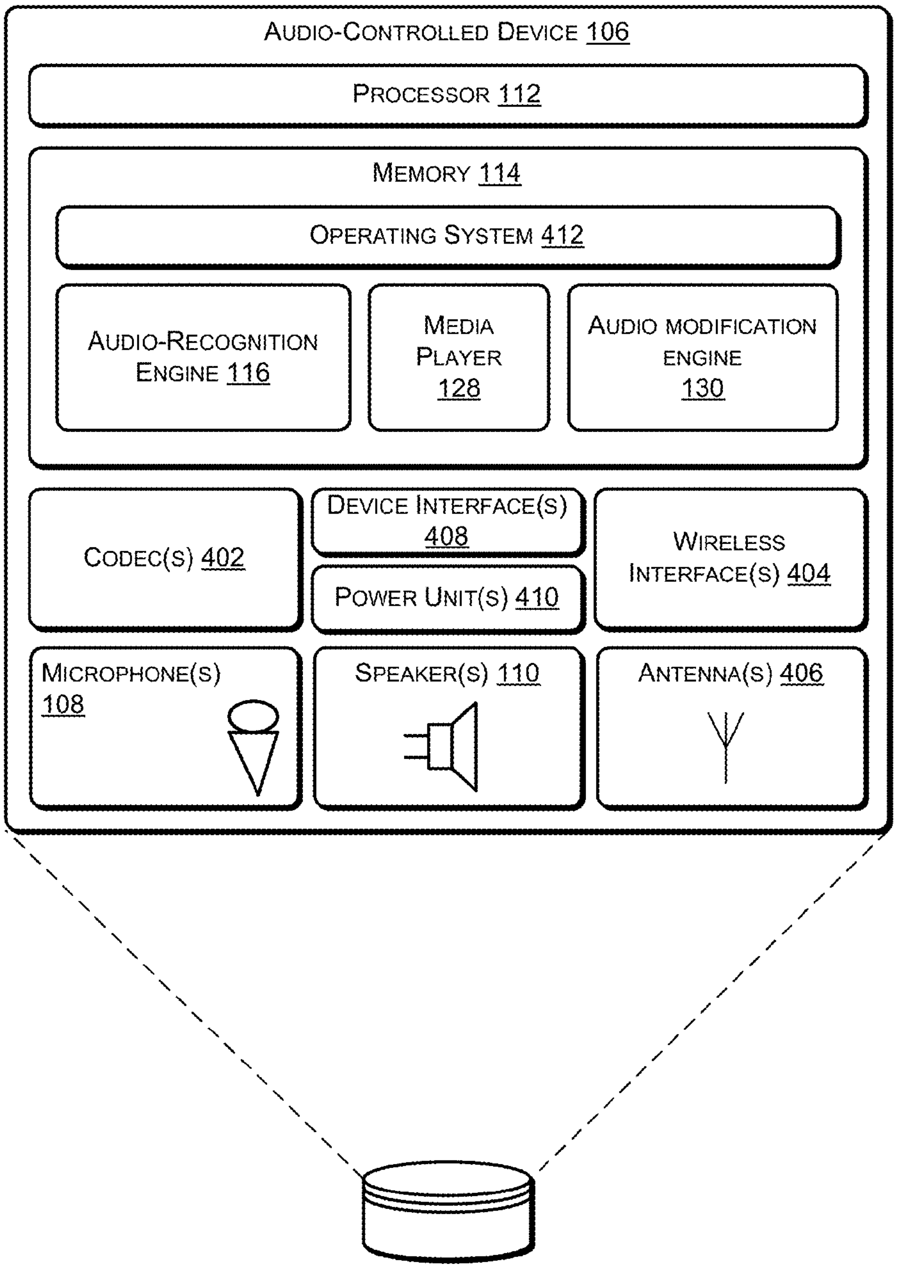
FIG. 4 shows a block diagram of selected functional components implemented in the audio-controlled device of FIG. 1.

FIG. 4 shows selected functional components of one implementation of the audio-controlled device 106 in more detail. Generally, the audio-controlled device 106 may be implemented as a standalone device that is relatively simple in terms of functional capabilities with limited input/output components, memory and processing capabilities. For instance, the audio-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the audio-controlled device 106 includes the processor 112 and memory 114. The memory 114 may include computer-readable storage media ("CRSM"), which may be any available physical media accessible by the processor 112 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 112.

The audio-controlled device 106 includes a microphone unit that comprises one or more microphones 108 to receive audio input, such as user voice input. The device 106 also includes a speaker unit that includes one or more speakers 110 to output audio sounds. One or more codecs 402 are coupled to the microphone 108 and the speaker 110 to encode and/or decode the audio signals. The codec may convert audio data between analog and digital formats. A user may interact with the device 106 by speaking to it, and the microphone 108 captures sound and generates an audio signal that includes the user speech. The codec 402 encodes the user speech and transfers that audio data to other components. The device 106 can communicate back to the user by emitting audible statements through the speaker 110. In this manner, the user interacts with the audio-controlled device simply through speech, without use of a keyboard or display common to other types of devices.

In the illustrated example, the audio-controlled device 106 includes one or more wireless interfaces 404 coupled to one or more antennas 406 to facilitate a wireless connection to a network. The wireless interface 404 may implement one or more of various wireless technologies, such as wifi, Bluetooth, RF, and so on.

One or more device interfaces 408 (e.g., USB, broadband connection, etc.) may further be provided as part of the device 106 to facilitate a wired connection to a network, or a plug-in network device that communicates with other wireless networks. One or more power units 410 are further provided to distribute power to the various components on the device 106.

The audio-controlled device 106 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the audio-controlled device 106 may include non-input control mechanisms, such as basic volume control button(s) for increasing/decreasing volume, as well as power and reset buttons. There may also be one or more simple light elements (e.g., LEDs around perimeter of a top portion of the device) to indicate a state such as, for example, when power is on or to indicate when a command is received. But, otherwise, the device 106 does not use or need to use any input devices or displays in some instances.

Several modules such as instruction, datastores, and so forth may be stored within the memory 114 and configured to execute on the processor 112. An operating system module 412 is configured to manage hardware and services (e.g., wireless unit, Codec, etc.) within and coupled to the device 106 for the benefit of other modules.

In addition, the memory 114 may include the audio-recognition engine 116, the media player 128, and the audio-modification engine 130. In some instances, some or all of these engines, data stores, and components may reside additionally or alternatively at the remote computing resources 118.

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:

1. An apparatus comprising:

a speaker to output audio in an environment;

a microphone unit to capture sound in the environment, the sound including the audio being output by the speaker and a clapping sound issued by a user in the environment;

a processor; and computer-readable media storing computer-executable instructions that, when executed by the processor, cause the processor to perform acts comprising:

receiving an audio signal generated by the microphone unit;

identifying, from the audio signal, the clapping sound issued by the user;

attenuating the audio being output by the speaker at least partly in response to the identifying; and identifying, from the audio signal or from the additional audio signal and while the audio being output by the speaker is attenuated, one or more predefined words spoken by the user.

2. An apparatus as recited in claim 1, the acts further comprising:

providing a subsequent audio signal to one or more computing devices that are remote from the environment at least partly in response to the identifying of the one or more predefined words, the one or more computing devices to perform speech recognition on the subsequent audio signal.

3. An apparatus as recited in claim 1, wherein the clapping sound comprises the user clapping the user's hands a predefined number of times.

4. An apparatus as recited in claim 1, wherein the clapping sound comprises the user clapping the user's hands in a predefined pattern.

5. An apparatus comprising:

a speaker to output audio in an environment;

a microphone unit to capture sound in the environment, the sound including a user in the environment issuing a non-speech command;

a processor; and computer-readable media storing computer-executable instructions that, when executed by the processor, cause the processor to perform acts comprising:

receiving an audio signal generated by the microphone unit;

identifying, from the audio signal, the non-speech command issued by the user;

altering the output of the audio at least partly in response to the identifying; and identifying, from the audio signal or from the additional audio signal and while the output of the audio by the speaker is altered, one or more predefined words spoken by the user.

6. An apparatus as recited in claim 5, the acts further comprising:

providing a subsequent audio signal to one or more computing devices that are remote from the environment at least partly in response to the identifying of the one or more predefined words, the one or more computing devices to perform speech recognition on the subsequent audio signal.

7. An apparatus as recited in claim 5, wherein the non-speech command comprises the user clapping the user's hands.

8. An apparatus as recited in claim 5, wherein the non-speech command comprises the user whistling.

9. An apparatus as recited in claim 5, wherein the non-speech command comprises the user striking an object in the environment.

10. An apparatus as recited in claim 5, wherein the altering comprises attenuating the audio.

11. An apparatus as recited in claim 5, wherein the altering comprises pausing the audio.

12. An apparatus as recited in claim 5, wherein:

the apparatus comprises two speakers, the two speakers outputting the audio in stereo; and the altering comprises switching the output of the audio from stereo to mono.

13. An apparatus as recited in claim 5, wherein:

the apparatus comprises two speakers, each of the two speakers outputting at least a portion of the audio; and the altering comprises turning off at least one speaker.

14. An apparatus as recited in claim 5, the acts further comprising returning the audio to its state prior to the altering, the returning occurring a predefined amount of time after the altering.

15. An apparatus as recited in claim 5, the acts further comprising returning the audio to its state prior to the altering, the returning occurring after a predefined amount of time that does not include speech from the user.

16. An apparatus as recited in claim 5, the acts further comprising:

again identifying the non-speech command from the user after the altering; and returning the audio to its state prior to the altering at least partly in response to again identifying the non-speech command.

17. A method comprising:

under control of an electronic device that includes a microphone unit, a speaker and executable instructions, outputting audio via the speaker sound captured by the determining that a user has issued a non-speech command based at least in part on microphone unit;

altering the output of the audio based at least in part on determining that the user has issued the non-speech command; and identifying, from the audio signal or from the additional audio signal and while the audio being output via the speaker is altered, one or more predefined words spoken by the user.

18. A method as recited in claim 17, wherein the non-speech command comprises the user clapping in a predefined pattern or striking an object in a predefined pattern.

19. A method as recited in claim 17, wherein the non-speech command comprises the user clapping a predefined number of times or striking an object a predefined number of times.

20. A method as recited in claim 17, wherein the non-speech command comprises the user whistling for a certain amount of time or in a certain frequency.

21. A method as recited in claim 17, wherein the non-speech command comprises the user whistling, the whistling either increasing in frequency over time or decreasing in frequency over time.

22. A method as recited in claim 17, wherein the altering comprises:

switching the output of the audio from stereo to mono; or pausing the audio.

* * * * *